UNITED STATES PATENT OFFICE.

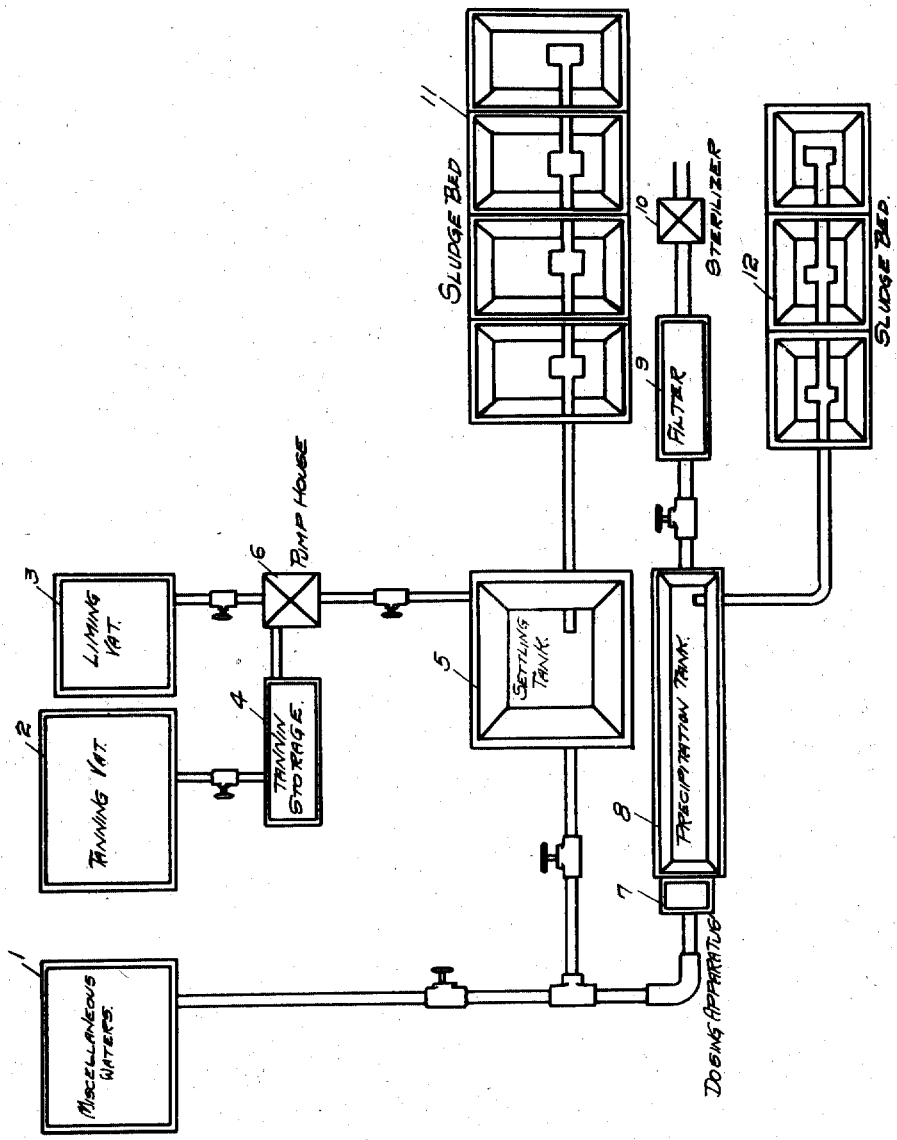

HENRY W. TAYLOR, OF NEW YORK, N. Y.

TANNERY-WASTE-DISPOSAL PROCESS.

1,277,776.  Specification of Letters Patent.  Patented Sept. 3, 1918.

Application filed November 28, 1916. Serial No. 133,928.

*To all whom it may concern:*

Be it known that I, HENRY W. TAYLOR, a citizen of the United States, residing at New York, in the county of New York and State of New York, have invented certain new and useful Improvements in Tannery-Waste-Disposal Processes, of which the following is a full, clear, and exact description, such as will enable others skilled in the art to which it appertains to make and use the same.

This invention relates to tanning processes, and with regard to its more specific features to a process for the disposal of otherwise waste material, and more specifically to the disposal of tanning wastes.

One of the objects of this invention is to enable a tan yard to be conducted with less objection than heretofore.

A further object is to dispose of the waste products from tan yards in a practical manner to get rid of the objectionable character of the same.

A further object is to enable the liquid wastes from a tan yard to be admitted to natural streams without the objectionable characteristics of the wastes polluting the streams, endangering fish life, and otherwise creating nuisance.

In a modern tan yard three prominent forms of waste liquors are discharged; the first is the miscellaneous water, such as those with which the hides are soaked and cleansed; the second is the lime wastes from the liming tanks; and the third is the tanning wastes discharged from the tanning vats. If these liquors be discharged into the neighboring streams, the alkaline wastes impart a strongly alkaline character to the stream, and the tan liquors impart a strongly acid character and an objectionable color to the stream, thus polluting the streams and endangering fish life. Furthermore, a large amount of matter is carried by the liquors, much of which is putrescible, and including, under many circumstances, disease spores, such as anthrax spore.

Furthermore, the lime wastes contain matter which is so insoluble and so readily precipitable as to make the hydraulic disposal thereof difficult or impracticable, and it has been the custom in some tanneries in consequence thereof to allow the insoluble limes to settle out in the liming tanks for the chemical removal after the supernatant liquid has been drawn off.

In accordance with this invention, the tanning waste and the lime waste are kept separate from each other and desirably separate from the miscellaneous waters and are united, preferably, in proper proportions to neutralize each other chemically. It is preferable to use the entire lime waste, that is, the liquid with the insoluble matter suspended therein. This forms a heavy flocculent precipitate which carries down with it a large part of the suspended matter, and destroys the objectionable chemical characteristics of both wastes, together with the deep objectionable color of the tanning waste.

By this interaction the insoluble suspended matter in the lime wastes, which is otherwise so readily precipitable as to make the hydraulic disposal thereof difficult or impracticable, is destroyed, probably entering into the composition of the flocculent precipitate in the settling tank. This results in the elimination of a precipitate which is inconvenient to dispose of, and its replacement by a precipitate which is viscous and can be handled hydraulically.

There results a liquor of a light color and with little objectionable matter contained therein. This liquor may be further purified, if desired, by mixing with a suitable coagulant and re-precipitating. For this purpose ferrous sulfate is highly advantageous, as it is capable of discharging the remaining color as well as carrying off much of the other remaining impurities. The united liquor from the wastes may be purified alone, but it is preferable to unite it with the miscellaneous waters, as in this way not only are the two liquors purified by a single step, but furtherfore more satisfactory purification appears to take place when these liquors are purified together than when purified separately, probably because of the remaining traces of the chemical constituents contained therein.

The liquor from this second precipitation is now sufficiently clear to make filtration practicable. The water after having been purified, either before or after it is filtered, is now sufficiently pure to make sterilization practicable.

In the accompanying drawings is shown a diagrammatic lay-out of a tan yard provided with apparatus for carrying out this invention. In these drawings, there is diagrammatically shown at 1, 2 and 3 a tank for the miscellaneous waste waters, a tanning vat and a liming vat.

In carrying out my process, means are employed which will permit the acid wastes and alkaline wastes to be united to form a precipitate, and preferably in such proportions as to cause them substantially to neutralize each other. This may be accomplished by retarding the discharge of the wastes from one of the vats until the proper amount of the other liquor is ready to be discharged. Although this may be done by holding one waste in the vats, the most practical method is to provide some means of storing one of these liquors in a separate storage tank until such time as the other is ready to be discharged, in order that the normal use of the vats shall not be interfered with.

In some aspects of this invention, it is immaterial which of the two wastes shall be stored, but it is more practicable to store the tanning waste, because the lime waste is apt to contain insoluble matter, such, for example, as insoluble limes which, if the lime waste is stored without mechanical treatment, may settle into a pasty mass at the bottom of the storage tank. This would be objectionable, both because of the necessity of insuring that the pasty mass be removed from the tank and because this pasty mass contains a substantial portion of the alkali, and under many circumstances there might result a deficiency of alkali to neutralize the tannin if the insoluble alkalis were not discharged with the liquor.

In the preferred form of this invention, therefore, the wastes from the tanning vats are run into one or more storage tanks (4), from which they can be discharged and mingled with the lime wastes in proper proportions to neutralize the latter, when the latter are being discharged from the lime vats.

Means are provided for mixing the discharge from the storage tank 4 with the alkaline wastes as the latter are discharged. As diagrammatically illustrated, this may consist of a pump station 6 having a sump therebeneath, into which the alkaline wastes are discharged and a valve for the admission of the tanning wastes from the storage tank 4, which valve may be controlled by the flow of the alkaline wastes, as, for example, by the rise in the level of the liquid in the sump beneath the pumping station. The liquor from the sump can be discharged into the settling tank 5 by any suitable means as by a bucket pump controlled by the discharge of the alkaline wastes, if desired.

It will be obvious that any means for insuring the discharge into the settling tank of the predetermined quantities of the lime and tanning wastes may be used, and the levels of the various vats and tanks may be such that a pump will be unnecessary to cause the proper flow. Under such circumstances a float valve or any other convenient arrangement may be used. In this settling tank, there will fall to the bottom the heavy precipitate, leaving the comparatively clear liquor above.

The proper quantities of tanning waste and lime waste to cause the maximum purification in the settling tank may be most readily determined by experiment with the liquors themselves. The excess of tanning is readily detected by the deepening of the color of the supernatant liquor and excess of the lime is readily detected by excess of alkalinity in the discharge. The proportions having once been determined, will remain substantially constant in the normal tan yard because of the substantially constant concentration of the discharge wastes. It has been found, however, that the total discharge from the tanning vats in the normal yard is substantially the proper quantity to correctly neutralize the total discharge from the liming vats. If the quantity of one of the wastes be greater than can be reacted upon by the other, and the excess be more than it is desired to have remain in the stream, the deficiency may be made up by adding a quantity of the deficient chemical or by otherwise disposing of the excess of the surplus waste. As, for example, if more lime waste were present than needed to react upon the tanning waste, the excess could be disposed of in any convenient manner, or, if too little, the necessary quantity of lime could be supplied.

The liquor from the settling tank 5 being united to the miscellaneous waters from the tank 1, may be conducted, through a suitable dosing apparatus 7, to a precipitation tank 8. In the dosing apparatus 7, there is added to the waters the desired quantity of a suitable coagulant, as ferrous sulfate. There results in this tank a precipitation of the coagulant carrying with it the larger part of the remaining impurities and discharging the color. This precipitate is a flocculent mass which readily settles to the bottom of the tank 7. The supernatant liquor from the tank 8 may then be carried off to a filter, indicated at 9. This filter is preferably either a sprinkling filter or a sand bed filter. The water, after having been purified by this filtration, may now be conducted to a suitable sterilizer, indicated at 10, where any disease germs or spores which remain therein may be destroyed. A practical method of sterilization consists in the use of ultra-violet rays. The sludges from the settling tank 5 and from the precipitation tank 8 both being of a flocculent, viscous nature, may be handled hydraulically and are conveniently disposed of by permitting them to flow from the bottom of these tanks onto suitable sludge beds. As illustrated, the numeral 11 indicates a bed adapted to receive the sludge from the tank ). These beds each consist preferably of a plurality of basins into which the sludges can be selectively discharged, so that the sludge in some basins may be drying out while one basin is being filled. The sludge, after being dried out, may be mechanically removed and disposed of in any convenient manner.

The apparatus illustrated is employed where it is important that the water from the wastes be discharged in a practically pure condition, and it will be noted that each succeeding step is rendered possible or practicable by the preceding steps. Thus, for example, the precipitation by ferrous sulfate is rendered more feasible by first removing the tannin impurities, and filtration on a practicable scale is made feasible with commercial apparatus and at commercial rates by the second precipitation, perhaps, because of the removal of the remaining traces of the tannin and other impurities. Furthermore, sterilization by ultraviolet rays is made feasible, because the preceding steps have clarified the water.

Where it is possible to discharge the wastes in a less pure condition than that which results from the carrying out of all the steps herein described, as, for example, where a large stream of water is available, into which the wastes may be discharged, so that such thorough purification is not required, one or more of the subsequent steps of purification may be omitted, and the water from the first settling tank, or from the precipitation tank, or from the filter, may be discharged directly into the stream. Furthermore, if sterilization is desired, but filtration is not necessary, the water may be sterilized as it comes from the precipitation tank.

Thus by the above process is accomplished, among others, the objects hereinbefore referred to; as well as others which will be obvious.

The invention accordingly consists in the several steps and the relation and order of one or more of such steps with relation to each of the others thereof, which have been exemplified in the above disclosed process, and the scope of the application of which will be indicated in the claims that follow.

As many changes could be made in carrying out the above process without departing from the scope of the invention, it is intended that all matter contained in the above description shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. The process of disposing of tannery wastes which comprises uniting the alkali and the tanning wastes in such proportions as substantially to neutralize each other.

2. The process of disposing of tannery wastes which comprises uniting the tannin and the liming waste, and correcting any disproportion which may exist between them by adding a substance equivalent to the deficient waste.

3. The process of disposing of the alkaline and tanning tannery wastes, which comprises storing one of them and uniting the stored waste to the other waste in such proportions that they will substantially neutralize each other.

4. The process of disposing of the alkaline and tanning wastes, which comprises storing the tanning waste, and uniting said tanning waste to said alkaline wastes in such proportions that they will substantially neutralize each other.

5. The process of disposing of the alkaline and tanning waste, which consists in storing the tanning waste, uniting the same to the alkaline waste, and separating the resultant precipitate from the liquid.

6. The process of disposing of tannery wastes which comprises segregating the tanning and lime wastes, uniting them, and separating the supernatant water from the resulting precipitate.

7. The process of disposing of tannery wastes, which comprises substantially neutralizing the tannin, subsequently purifying the liquor by precipitation with iron salt.

8. The process of disposing of tannery waste, which comprises removing the largest part of the lime and tannin and then decolorizing with an iron sulfate.

9. The process of disposing of tannery wastes, which comprises uniting the tannin waste and the liming waste, eliminating the resultant precipitate, purifying by a second precipitation, and then filtering.

10. The process of disposing of tannery wastes, which comprises uniting the tannin waste and the liming waste, eliminating the resultant precipitate, purifying by a second precipitation with iron sulfate, and then filtering.

11. The process of disposing of the alkaline and tanning wastes, which comprises uniting them in proportions to neutralize each other, eliminating the resultant precipitate, and in purifying the resultant liquid.

12. The process of disposing of tannery wastes, which comprises uniting the tannin and the liming waste, correcting any disproportion which may exist between them by adding a substance equivalent to the deficient waste, and subsequently purifying the resultant product by precipitation.

13. The process of disposing of the alkaline and tanning tannery wastes, which comprises storing one of them, uniting the stored waste to the other waste in such proportions that they will neutralize each other, eliminating the resultant precipitate, and in purifying the resultant liquid.

14. The process of disposing of tannery wastes, which comprises segregating the tannin and lime wastes, uniting them, separating the supernatant water from the resulting precipitate, and subsequently purifying by precipitation with a suitable precipitant.

15. The process of disposing of the alkaline and tanning waste, which comprises uniting the wastes, separating the resultant precipitate from the liquid, uniting the said liquid to the miscellaneous waters of the tan yard, and subsequently purifying the combined waters.

16. The process of disposing of tannery wastes, which consists in separating the wastes into three classes, comprising the tanning wastes, the liming wastes and the miscellaneous waters, uniting the tanning waste and the liming waste, separating the resultant precipitate, mingling the resultant supernatant liquor with the miscellaneous waters, and purifying the resultant liquor by precipitation with a suitable precipitant.

17. The process of disposing of tannery wastes, which consists in separating the wastes into three classes, comprising the tanning wastes, the liming wastes and the miscellaneous waters, uniting the tanning waste and the liming waste, separating the resultant precipitate, mingling the resultant supernatant liquor with the miscellaneous waters, and purifying the resultant liquor by precipitation with an iron sulfate.

18. The process of disposing of tannery wastes, which consists in neutralizing the tanning and alkaline wastes, eliminating the resultant neutralized chemicals, uniting the liquor to the miscellaneous waters, and in purifying the resultant liquid.

19. The process of disposing of tannery wastes, which consists in segregation of the tanning and alkaline wastes from each other and from the miscellaneous waters, storing one of said first-mentioned wastes, uniting the stored wastes to the other of said first-mentioned wastes, permitting the resultant precipitate to settle, uniting the supernatant liquid to the miscellaneous waters, and purifying the resultant liquid.

20. The process of disposing of tannery wastes, which consists in segregation of the tannin and alkaline wastes from each other and from the miscellaneous waters, storing the tanning waste, uniting the tanning waste to the alkaline waste, permitting the resultant precipitate to settle, uniting the supernatant liquid to the miscellaneous waters, and purifying the resultant liquid.

21. The process of disposing of tannery wastes, which consists in neutralizing the tanning and alkaline wastes, eliminating the neutralized chemicals, uniting the liquor to the miscellaneous waters, and in purifying the resultant liquid by precipitation with a suitable precipitant.

22. The process of disposing of the alkaline and tanning wastes, which comprises uniting the wastes, separating the resultant precipitate from the liquid, uniting the said liquid to the miscellaneous waters of the tan yard, and subsequently purifying the combined waters by precipitation with a suitable precipitant.

23. The process of disposing of tannery wastes, which consists in separating the wastes into three classes, comprising the tanning wastes, the liming wastes and the miscellaneous waters, uniting the tanning waste and the liming waste in proportions substantially to neutralize each other, mingling the resultant supernatant liquor with the miscellaneous waters, and purifying the resultant liquor by precipitation with a suitable precipitant.

24. The process of disposing of tannery waste, which comprises removing the largest part of lime and tannin from the liming and tannin wastes, and then adding the miscellaneous waters and purifying by precipitation with an iron sulfate.

25. The process of disposing of tannery wastes, which consists in separating the wastes into three classes, comprising the tanning wastes, the liming wastes and the miscellaneous waters, storing the tanning waste, uniting the tanning waste and the liming waste, in proportions substantially to neutralize each other, mingling the resultant supernatant liquor with the miscellaneous waters, and purifying the resultant liquor by precipitation with a suitable precipitant.

26. The process of disposing of tannery wastes, which consists in neutralizing the tanning and alkaline wastes, eliminating the neutralized chemicals, uniting the liquor to the miscellaneous waters, purifying the resultant liquid by precipitation with a suitable precipitant, and subsequently sterilizing the purified water.

27. The process of disposing of tannery wastes, which consists in segregation of the tanning and alkaline wastes from each other and from the neutral wastes, storing one of said first-mentioned wastes, uniting the stored wastes to the other of said first-mentioned wastes, permitting the resultant precipitate to settle, uniting the supernatant liquid from the settling tank to the neutral wastes, purifying the resultant liquid, and disinfecting the filtered liquid.

28. The process of disposing of tannery wastes, which consists in separating the wastes into three classes, comprising the tanning waste, the liming waste and the miscellaneous waters, storing one of the first-mentioned wastes and uniting it to the other of the first-mentioned wastes in such proportions as to substantially eliminate the tannin, uniting the resulting liquor free from the resulting precipitate to the miscellaneous water, and purifying the combined waters by a precipitation with a suitable precipitant such as ferrous sulfate.

29. The process of disposing of tannery wastes, which consists in separating the wastes into three classes, comprising the tanning waste, the liming waste and the miscellaneous waters, storing one of the first-mentioned wastes and uniting it to the other of the first-mentioned wastes in such proportion as to substantially eliminate tannin, uniting the resulting liquor free from the resulting precipitate to the miscellaneous water, purifying the combined waters by a precipitation with a suitable precipitant such as ferrous sulfate, and subsequently filtering the resultant water.

30. The tanning process which consists in subjecting the hides to the action of a liming liquor in the liming tank and to the action of a tanning liquor in a tanning vat, uniting the liming liquor and the tanning liquor, removing the supernatant liquid from the resultant precipitate and conducting the resultant precipitate to a suitable drying bed.

31. The tanning process, which consists in subjecting the hides to the action of a liming liquor in a liming vat and to the action of tanning liquors in a tanning vat, subsequently uniting the liquors from the two vats in a tank, permitting the precipitate which is formed when the liquors are united to settle out, drawing off the supernatant water, and permitting the precipitate to flow from the tank.

32. The tanning process which consists in washing the hides, subjecting them to the action of a liming liquor in a liming vat and to the action of a tanning liquor in a tanning vat, subsequently uniting the liquor from the tanning vat to the liquor from liming vat and removing the resultant precipitate from the liquor, adding the wash waters to the liquors from which the first precipitate has been removed, and purifying the mixed waters by precipitation with a suitable precipitant.

In testimony whereof I affix my signature in the presence of two witnesses.

HENRY W. TAYLOR.

Witnesses:
WILLIS B. RICE,
MARY L. KEELER.